(12) United States Patent
Soga

(10) Patent No.: US 10,909,395 B2
(45) Date of Patent: Feb. 2, 2021

(54) OBJECT DETECTION APPARATUS

(71) Applicant: Toyota Jidosha Kabushiki Kaisha, Toyota Aichi-ken (JP)

(72) Inventor: Mineki Soga, Nisshin Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 280 days.

(21) Appl. No.: 15/945,973

(22) Filed: Apr. 5, 2018

(65) Prior Publication Data

US 2018/0293450 A1     Oct. 11, 2018

(30) Foreign Application Priority Data

Apr. 7, 2017   (JP) ................. 2017-076871

(51) Int. Cl.

| | |
|---|---|
| *G06K 9/00* | (2006.01) |
| *G06T 7/73* | (2017.01) |
| *G06T 7/80* | (2017.01) |
| *G06T 7/50* | (2017.01) |
| *G06T 7/77* | (2017.01) |
| *G06K 9/62* | (2006.01) |

(52) U.S. Cl.
CPC ..... *G06K 9/00825* (2013.01); *G06K 9/00208* (2013.01); *G06K 9/6262* (2013.01); *G06T 7/50* (2017.01); *G06T 7/73* (2017.01); *G06T 7/77* (2017.01); *G06T 7/80* (2017.01); *G06T 2207/20084* (2013.01); *G06T 2207/30261* (2013.01); *G06T 2210/12* (2013.01)

(58) Field of Classification Search
CPC .... G06K 9/00825; G06K 9/6262; G06T 7/77; G06T 7/50; G06T 2207/20084; G06T 7/80; G06T 2210/12; G06T 2207/30261
See application file for complete search history.

(56) References Cited

U.S. PATENT DOCUMENTS

2007/0154068 A1* 7/2007 Stein .................... G01B 11/026
  382/106
2013/0332066 A1* 12/2013 Jeung ................. G01C 21/3602
  701/420

(Continued)

FOREIGN PATENT DOCUMENTS

| | | |
|---|---|---|
| JP | 2009176091 A | 8/2009 |
| JP | 2017016395 A | 1/2017 |

*Primary Examiner* — Kevin Ky
(74) *Attorney, Agent, or Firm* — Dinsmore & Shohl LLP

(57) ABSTRACT

An object detection apparatus is provided with: an imager configured to image surroundings of a subject vehicle and to obtain a surrounding image; an object detector configured to detect an interested-object from the surrounding image and to output first image coordinates, which indicate a position of the detected interested-object on the surrounding image; a calculator configured to associate the interested-object with one or more coordinate points out of a plurality of coordinate points, each of which indicates three-dimensional coordinates of respective one of a plurality of points on a road, on the basis of the first image coordinates and a position of the subject vehicle, and configured to calculate at least one of a position of the interested-object on a real space and a distance to the interested-object from the subject vehicle on the basis of the position of the subject vehicle and the one or more coordinate points associated.

6 Claims, 2 Drawing Sheets

(56) References Cited

U.S. PATENT DOCUMENTS

| | | | |
|---|---|---|---|
| 2015/0210274 A1* | 7/2015 | Clarke | B60K 31/00 382/104 |
| 2016/0003636 A1* | 1/2016 | Ng-Thow-Hing | G08G 1/167 701/26 |
| 2016/0217583 A1* | 7/2016 | Uchida | H04N 13/204 |
| 2017/0329335 A1* | 11/2017 | DelMarco | G01C 21/005 |
| 2018/0158203 A1* | 6/2018 | Kanetake | G06T 7/55 |
| 2018/0330481 A1* | 11/2018 | Watanabe | G06T 5/006 |

* cited by examiner

OBJECT DETECTION APPARATUS

CROSS-REFERENCE TO RELATED APPLICATIONS

This application is based upon and claims the benefit of priority of the prior Japanese Patent Application No. 2017-076871, filed on Apr. 7, 2017, the entire contents of which are incorporated herein by reference.

BACKGROUND

1. Technical Field

Embodiments of the present disclosure relate to an object detection apparatus, and particularly relate to an object detection apparatus configured to specify a position of a detected object.

2. Description of the Related Art

For this type of apparatus, for example, there is proposed an apparatus that is configured to detect an object on the basis of information about a position including a distance to the object, by analyzing a pair of images photographed or imaged by a stereo camera. The apparatus is configured (i) to form a distance image from the pair of images and to detect the information about the position including information about a distance on a real space of an object that is in the surroundings, (ii) to make a histogram for each of a plurality of divisional spaces that extend in a vertical direction in the real space, (iii) to vote the information about the distance of the object, to a histogram corresponding to a divisional space to which the information about the position of the object belongs, and (iv) to calculate representative distances of divisional spaces on the basis of voting results and to detect the object by grouping the calculated representative distances (refer to Japanese Patent Application Laid Open No. 2009-176091 (Patent Literature 1)).

There is also proposed an apparatus that is configured (i) to determine, from an image, virtual coordinates of a waypoint on the image, which is obtained by photographing or imaging a running area of a vehicle with a camera mounted on a flight vehicle, and (ii) to irradiate the ground with a laser light from a laser irradiation apparatus mounted on the flight vehicle, and to set a real irradiation point of the laser light when irradiation point coordinates of the laser light on the image matches the virtual coordinates, to real position coordinates of the waypoint (refer to Japanese Patent Application Laid Open No. 2017-016395 (Patent Literature 2)).

As in the case of a technology/technique described in the Patent Literature 1, a technology/technique in which the object is detected by using the stereo camera, for example, requires a relatively large calculation amount associated with parallax calculation. In addition, for example, in order to accurately perform the parallax calculation, the calibration of the stereo camera is required as a previous step. In other words, the technology/technique described in the Patent Literature 1 requires a relatively high processing load associated with the detection of the object.

SUMMARY

In view of the aforementioned problem, it is therefore an object of embodiments of the present disclosure to provide an object detection apparatus configured to detect an object while reducing a processing load.

The above object of embodiments of the present disclosure can be achieved by an object detection apparatus provided with: an imager configured to image surroundings of a subject vehicle and to obtain a surrounding image; an interested-object detector configured to detect an interested-object from the surrounding image and to output first image coordinates, which indicate a position of the detected interested-object on the surrounding image; a position detector configured to detect a position of the subject vehicle; a map storage configured to store therein map information including a plurality of coordinate points, each of which indicates three-dimensional coordinates of respective one of a plurality of points on a road; and a calculator configured to associate the interested-object with one or more coordinate points out of the plurality of coordinate points on the basis of the first image coordinates and the position of the subject vehicle, and configured to calculate at least one of a position of the interested-object on a real space and a distance to the interested-object from the subject vehicle on the basis of the position of the subject vehicle and the associated one or more coordinate points.

According to the object detection apparatus, the map information is used, by which a distance calculation process using only images, such as, for example, parallax calculation using a pair of left and right images photographed or imaged by a stereo camera, is not required, and a processing load associated with the calculation of the position of the interested-object and the distance to the interested-object from the subject vehicle can be reduced. On the object detection apparatus, the position of the interested-object and the distance to the interested-object from the subject vehicle can be calculated without using the stereo camera. Thus, for example, the calibration of the stereo camera is not required.

A pattern recognition technique/technology using machine learning, such as a neutral network, can be applied to a method of detecting the interested-object from the surrounding image. The "position of the interested-object in the surrounding image (i.e., the first image coordinates)" may be, for example, image coordinates that represent an area occupied by the interested-object in the surrounding image, or the like.

In one aspect of the object detection apparatus according to embodiments of the present disclosure, the object detection apparatus is provided with: an optical axis estimator configured to estimate an optical axis direction of the imager, wherein the calculator is configured to associate the interested-object with the one or more coordinate points out of the plurality of coordinate points on the basis of the estimated optical axis direction. By virtue of such a configuration, the interested-object can be appropriately associated with the coordinate point(s), for example, even when the optical axis of the imager is shifted from a lane extension direction.

In another aspect of the object detection apparatus according to embodiments of the present disclosure, the calculator is configured to convert the associated one or more coordinate points to image coordinates of the surrounding image, and is configured to calculate at least one of the position of the interested-object on the real space and the distance to the interested-object from the subject vehicle, from three-dimensional coordinates indicted by a coordinate point that is converted to image coordinates that are the closest to the first image coordinates. Alternatively, in another aspect of the object detection apparatus according to embodiments of the present disclosure, the calculator is configured to associate the interested-object with two or more coordinate points out of the plurality of coordinate points on the basis of the first image coordinates and the position of the subject vehicle, and is configured to calculate at least one of the position of the interested-object on the real space and the distance to the interested-object from the subject vehicle, by an average using three-dimensional coordinates respectively indicated by at least two coordinate points out of the associated two or more coordinate points.

According to these aspects, it is possible to calculate the position of the interested-object on the real space and the distance to the interested-object from the subject vehicle, relatively easily. The coordinate point (i.e. the position on the real space) and the image coordinates on the surrounding image can be associated with each other if an external parameter (i.e., position and posture) and an internal parameter (i.e., optical parameter) of the imager are known. In other words, the coordinate point can be converted to the image coordinates.

The nature, utility, and further features of this disclosure will be more clearly apparent from the following detailed description with reference to embodiments of the disclosure when read in conjunction with the accompanying drawings briefly described below.

DETAILED DESCRIPTION OF THE EMBODIMENTS

An object detection apparatus according to embodiments of the present disclosure will be explained with reference to FIG. 1 to FIG. 3C.

(Configuration of Apparatus)

Figure 1:
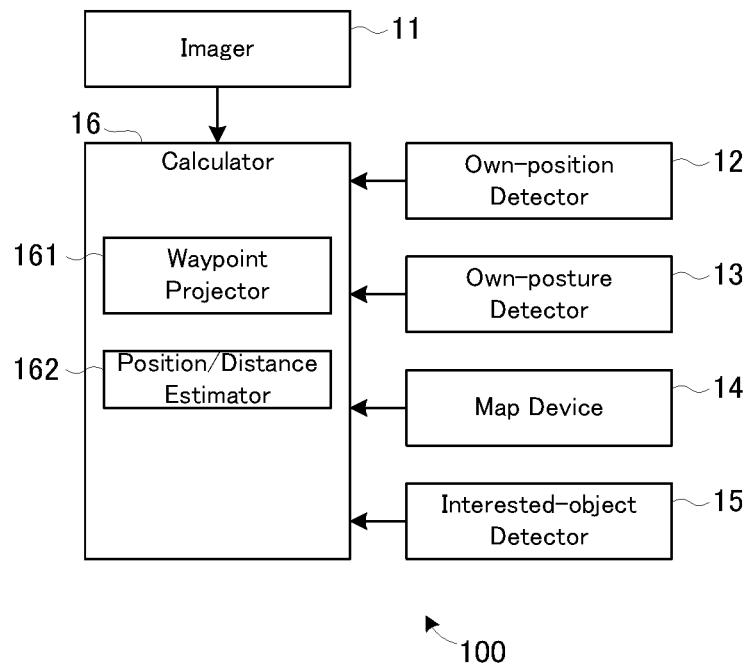
FIG. 1 is a block diagram illustrating a configuration of an object detection apparatus according to an embodiment.

A configuration of an object detection apparatus according to an embodiment will be explained with reference to FIG. 1. FIG. 1 is a block diagram illustrating the configuration of the object detection apparatus according to the embodiment.

In FIG. 1, an object detection apparatus 100 is mounted on a vehicle 1, which is an example of the "subject vehicle" according to embodiments of the present disclosure. The object detection apparatus 100 is provided with an imager 11, an own-position detector 12, an own-posture detector 13, a map device 14, an interested-object detector 15, and a calculator 16.

The imager 11 has an imaging element, such as, for example, a complementary metal oxide semiconductor (CMOS) and a charge coupled device (CCD). The imager 11 is configured to image or photograph surroundings of the vehicle 1 (which is typically an area ahead of or in front of the vehicle 1) and to subsequently obtain a surrounding image.

The own-position detector 12 is configured to receive, for example, a global positioning system (GPS) signal and to detect a position of the object detection apparatus 100 (i.e., a position of the vehicle 1 on which the object detection apparatus 100 is mounted). The own-position detector 12 may improve, for example, the accuracy of the position detected from the GPS signal, on the basis of an output of an internal sensor, such as, for example, a gyro sensor. Alternatively, the own-position detector 12 may improve, for example, the accuracy of the position detected from the GPS signal, for example, by converting the surrounding image obtained by the imager 11 to an overhead image and by obtaining a position having the highest correlation with a road surface texture stored as map information.

The own-posture detector 13 is configured to estimate a posture of the object detection apparatus 100, which is particularly an optical axis direction of the imager 11, for example, on the basis of the output of the gyro sensor.

The map device 14 is, for example, a map database, and is configured to store therein road map information. The road map information may include information indicating a road shape and a road slope. Specifically, the road map information may include a plurality of data points, each of which indicates three-dimensional coordinates, such as, for example, latitude, longitude, and altitude, and may include connection information, which indicates a road connecting the plurality of data points. The plurality of data points may include not only a data point corresponding to a node point, i.e., a node, such as, for example, an intersection, but also data points arranged at fixed intervals along a road or each lane. In the embodiment, the plurality of data points are referred to as "waypoints".

The interested-object detector 15 is configured to detect an interested-object (e.g., another vehicle, a pedestrian, an obstacle, etc.) by using pattern recognition from the surrounding image obtained by the imager 11, and is configured to output image coordinates thereof (i.e., image coordinates indicating a position of the interested-object on the surrounding image).

The calculator 16 is provided with a waypoint projector 161 and a position/distance estimator 162, as processing blocks logically realized therein or processing circuits physically realized therein, in order to calculate at least one of the position of the interested-object and a distance to the interested-object from the vehicle 1.

(Object Detection Process)

An object detection process performed by the object detection apparatus 100 as configured above will be explained with reference to a flowchart in FIG. 2. In the explanation below, an example of the interested-object is another vehicle that runs ahead of the vehicle 1.

Figure 2:
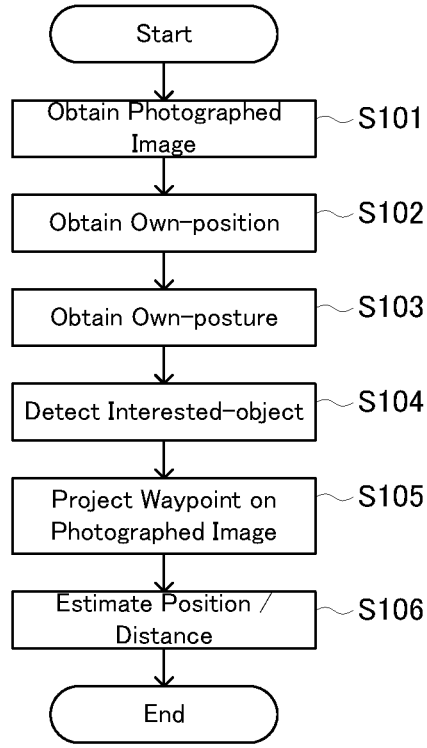
FIG. 2 is a flowchart illustrating an object detection process according to the embodiment.

In FIG. 2, the interested-object detector 15 and the calculator 16 obtain the surrounding image form the imager 11 (step S101). The calculator 16 obtains the position of the object detection apparatus 100 (i.e., an own-position) from the own-position detector 12 (step S102). The calculator 16 obtains the posture of the object detection apparatus 100 (i.e., an own-posture), which includes the optical axis direction of the imager 11, from the own-posture detector 13 (step S103). The steps S101 to S103 may be performed in parallel or in any order.

The interested-object detector 15 then detects the interested-object from the surrounding image, and the calculator 16 obtains the image coordinates indicating the position of the object, from the interested-object detector 15 (step S104). Now, with reference to FIG. 3A to FIG. 3C, a specific explanation will be given to a method of detecting another vehicle as the interested-object when an image showing another vehicle that runs ahead of the vehicle 1 is obtained as the surrounding image.

Figure 3A:
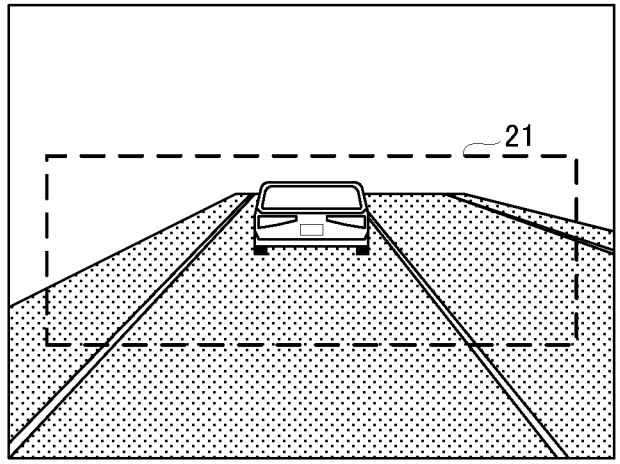
FIG. 3A is a diagram illustrating a concept of the object detection process according to the embodiment.
Figure 3B:
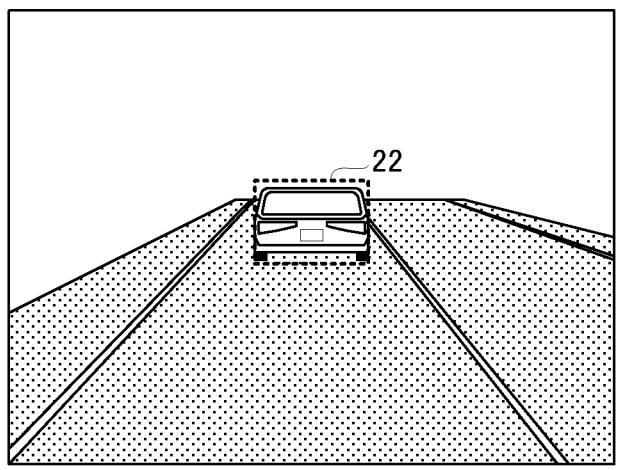
FIG. 3B is a diagram illustrating the concept of the object detection process according to the embodiment.

The interested-object detector 15 is configured to firstly set a search area 21 on the surrounding image, as illustrated in FIG. 3A. The search area 21 is set in accordance with the interested-object. For example, if the interested-object is a vehicle, the vehicle is not out of a road, such as in the sky. Thus, the search area including, for example, an area corresponding to the sky as little as possible may be set on the basis of a view angle and an installation angle or the like associated with the imager 11. Erroneous detection can be prevented by limiting the search area in this manner.

The interested-object detector 15 is configured to then detect the interested-object by using the pattern recognition in the search area 21. The pattern recognition can use the existing technology/technique, such as, for example, a method based on machine learning, like a deep neutral network or the like. If the interested-object is detected, the interested-object detector 15 may set a detection frame 22 indicating the detected interested-object (which is another vehicle here) (refer to FIG. 3B). The interested-object detector 15 is further configured to output image coordinates of the center of a lower side of the detection frame 22 (refer to a black circle 22a in FIG. 3C) as the image coordinates of the interested-object in the surrounding image. This is because three-dimensional coordinates indicated by a waypoint correspond to a point on the road. Thus, if the image coordinates corresponding to a position that is considered to be the closest to the road out of an area surrounded by the detection frame 22 is set as the position of the interested-object, it is then possible to prevent an error associated with the calculation of the position or the like of the interested-object.

Figure 3C:
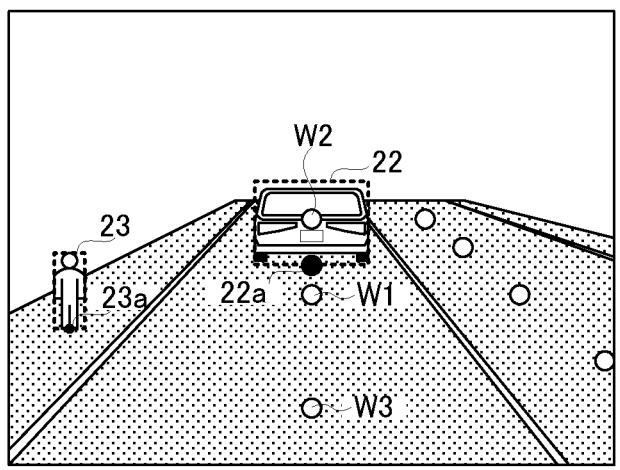
FIG. 3C is a diagram illustrating the concept of the object detection process according to the embodiment.

After the step S104 in FIG. 2, the waypoint projector 161 projects the waypoint on the surrounding image (step S105). Specifically, the waypoint projector 161 obtains (or extracts) one or a plurality of waypoints included in the road map information, from the map device 14, on the basis of the position of the object detection apparatus 100. Here, the obtained waypoint may be a waypoint corresponding to a point that is estimated to be shown in the surrounding image, on the basis of the position of the object detection apparatus 100. The waypoint projector 161 is configured to project the obtained one or plurality of waypoints on the surrounding image, on the basis of an external parameter of the imager 11 (e.g., the position and the optical axis direction) and an internal parameter of the imager 11 (e.g., a lens focal distance, a pixel interval, etc.); namely, the waypoint projector 161 is configured to convert the waypoint(s) to the image coordinates on the surrounding image. FIG. 3C illustrates an example of the surrounding image on which the waypoints are projected. White circles in FIG. 3C indicate the waypoints.

After the step S105 in FIG. 2, the position/distance estimator 162 calculates (or estimates) at least one of the position of the interested-object and the distance to the interested-object from the vehicle 1, on the basis of the image coordinates indicating the position of the interested-object in the surrounding image, and on the basis of the waypoint(s) projected on the surrounding image (step S106). Here, a method of calculating the position or the like of the interested-object will be specifically explained with reference to FIG. 3C.

(First Method)

In a first method, the position/distance estimator 162 may specify a waypoint corresponding to image coordinates that are the closest to the image coordinates 22a, which indicate the position of the interested-object in the surrounding image. In FIG. 3C, it is assumed that a waypoint W1 is specified as the relevant waypoint. The position/distance estimator 162 may set three-dimensional coordinates indicated by the waypoint W1, as a real position of the interested-object. The position/distance estimator 162 may calculate a difference between the three-dimensional coordinates indicated by the waypoint W1 and the position of the object detection apparatus 100, as the distance to the interested-object from the vehicle 1.

(Second Method)

In a second method, the position/distance estimator 162 may specify a plurality of waypoints that are located in the vicinity of the interested-object in the surrounding image, and may associate them with the interested-object. In FIG. 3C, it is assumed that the waypoint W1 and a waypoint W2 are specified as waypoints having the closest pixel distances to the image coordinates that indicate the position of the interested-object. The position/distance estimator 162 may calculate the position of the interested-object on a real space by an average of three-dimensional coordinates that are respectively indicated by the waypoints W1 and W2. Here, the average may be, for example, a weighted average using a weight, which is defined by normalizing the reciprocal of an inter-pixel distance between the image coordinates of the interested-object and the waypoints W1 and W2. Not only the weighted average but also various existing average (methods), such as a simple average and a geometrical average, can be applied to the "average". The position/distance estimator 162 may calculate a difference between the calculated real position of the interested-object and the position of the object detection apparatus 100, as the distance to the interested-object from the vehicle 1.

Which of the first and second methods to be used may be determined in accordance with, e.g., target accuracy, a waypoint arrangement interval, or the like. Specifically, if the waypoints are relatively densely arranged (e.g., if the waypoints are arranged at intervals of several meters), the first method is desirably used. On the other hand, if the waypoints are relatively loosely arranged (e.g., if the waypoints are arranged at intervals of several ten meters or more), the second method is desirably used. The first method does not require the average, and thus can reduce a processing load in comparison with the second method.

If the object is something that is rarely on a lane, such as, for example, a pedestrian, the position/distance estimator 162 may calculate the position of the interested-object in the following manner. For example, in FIG. 3C, it is assumed that a pedestrian corresponding to a detection frame 23 is the interested-object. The position/distance estimator 162 may compare a vertical-direction coordinate of image coordinates 23a of the center of a lower side of the detection frame 23, with a vertical-direction coordinate of image coordinates with which the waypoint is associated.

In the case of the first method, the position/distance estimator 162 may associate the waypoint that is converted to a vertical-direction coordinate that is the closest to the vertical-direction coordinate of the image coordinates 23a, with the interested-object (i.e. pedestrian). The position/distance estimator 162 may use the position of the associated waypoint to obtain a distance to the associated waypoint from the vehicle 1, and may set this to an approximate distance of the distance to the interested-object (i.e. pedestrian). The position/distance estimator 162 may further calculate at least one of the position of the interested-object (i.e. pedestrian) and the distance to the interested-object from the vehicle 1, from a difference between a horizontal-direction coordinate of the image coordinates of the specified waypoint and a horizontal-direction coordinate of the image coordinates 23a, and from the internal parameter of the imager 11.

Alternatively, in the case of the second method, the position/distance estimator 162 may specify the waypoints W1 and W3, which are located in the vicinity of the vertical-direction of the image coordinates 23*a*, and may associate them with the interested-object (i.e. pedestrian). The position/distance estimator 162 may calculate at least one of the position of the interested-object (i.e. pedestrian) and the distance to the interested-object from the vehicle 1, by an average of three-dimensional coordinates that are respectively indicated by the waypoints W1 and W3.

If a face detection method is used for the detection of the pedestrian as the interested-object, (in this case, the detection frame is set in the vicinity of a head), a lower side of the detection frame is different from a grounding point in most cases. In this case, the position or the like of the pedestrian as the interested-object is desirably calculated, for example, after image coordinates corresponding to the grounding point are estimated from the position of the detection frame.

In the embodiment, another vehicle that runs ahead of the vehicle 1 is exemplified as the object, but another vehicle that runs behind or beside the vehicle 1 or the like may be treated as the interested-object.

(Technical Effect)

For the method of detecting the position of the interested-object, such as, for example, another vehicle and a pedestrian, that is in the surroundings of the subject vehicle, there is proposed a method of using a sensor configured to measure a distance, such as, for example, a radar and light detection and ranging (LIDAR). This method, however, has a difficulty in identifying and detecting an interested-object, and has a relatively high cost.

Alternatively, a method using a stereo camera is proposed. This method, however, requires a relatively large calculation amount associated with parallax calculation. In addition, the calibration of the stereo camera is required. Therefore, the processing load is relatively high in this method.

Alternatively, for a method using a monocular camera, there is proposed a method in which it is assumed that a road has a flat surface. For example, a distance to an interested-object from a lower end position of a photographed image may be on the basis of a parameter associated with the camera, such as, for example, a camera installation position, a camera optical axis direction, a view angle, and a focal distance. In this case, however, if there is a gradient on the road surface, an estimation error is relatively large. Moreover, in another method using the monocular camera, the distance may be estimated from a size of the interested-object in the photographed image and an actual size of the interested-object. In this case, an error of the estimated distance is relatively large due to a variation in the actual size (e.g., if a passenger car is the interested-object, a width thereof relatively significantly varies by about 1.4 to 2 meters).

By the way, the interested-object is detected from the surrounding image photographed or imaged by the imager 11 on the object detection apparatus 100. The photographed surrounding image has a higher spatial resolution than the sensor configured to measure the distance, and can obtain a detailed shape even in the case of the object located relatively far. Therefore, according to the object detection apparatus 100, it is possible to identify and detect the interested-object, more easily, than the sensor configured to measure the distance.

In addition, the parallax calculation in using the stereo camera is not required to calculate the position or the like of the interested-object on the object detection apparatus 100. Therefore, according to the object detection apparatus 100, it is possible to reduce the processing load in comparison with the method using the stereo camera. On the other hand, the waypoint included in the road map information is used to calculate the position or the like of the interested-object on the object detection apparatus 100. Therefore, unlike the aforementioned method using the monocular camera, it is possible to calculate the position or the like of the interested-object without being influenced by the road surface gradient (and moreover, even if the actual size of the interested-object is unknown).

As a result, according to the object detection apparatus 100, it is possible to detect the interested-object with high accuracy while reducing the processing load and to calculate the position or the like of the interested-object with relatively high accuracy.

The "own-position detector 12", the "own-posture detector 13", and the "map device 14" according to the embodiment are respectively an example of the "position detector", the "optical axis estimator" and the "map storage" according to embodiments of the present disclosure. The "waypoint projector 161" and the "position/distance estimator 162" according to the embodiment are an example of the "calculator" according to embodiments of the present disclosure.

The disclosure may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An object detection apparatus comprising:
   an imager configured to image surroundings of a subject vehicle and to obtain a surrounding image;
   an interested-object detector configured to detect an interested-object from the surrounding image and to output first image coordinates, which indicate a position of the detected interested-object on the surrounding image;
   a position detector configured to detect a position of the subject vehicle;
   a map storage configured to store therein map information including a plurality of coordinate points, each of which indicates three-dimensional coordinates of respective one of a plurality of points arranged at fixed intervals along a road;
   a waypoint projector configured to obtain one or more waypoints comprising one or more of the plurality of coordinate points; and
   a calculator configured to associate the interested-object with one or more coordinate points out of the plurality of coordinate points on the basis of the first image coordinates and the positon of the subject vehicle, and configured to calculate a position of the interested-object on a real space and a distance to the interested-object from the subject vehicle on the basis of the position of the subject vehicle and the one or more waypoints.

2. The object detection apparatus according to claim 1, comprising:
   an optical axis estimator configured to estimate an optical axis direction of said imager, wherein
   said calculator is configured to associate the interested-object with the one or more coordinate points out of the plurality of coordinate points on the basis of the estimated optical axis direction.

3. The object detection apparatus according to claim 2, wherein said calculator is configured to convert the associated one or more coordinate points to image coordinates of the surrounding image, and is configured to calculate at least one of the position of the interested-object on the real space and the distance to the interested-object from the subject vehicle, from three-dimensional coordinates indicted by a coordinate point that is converted to image coordinates that are the closest to the first image coordinates.

4. The object detection apparatus according to claim 2, wherein
said calculator
is configured to associate the interested-object with two or more coordinate points out of the plurality of coordinate points on the basis of the first image coordinates and the position of the subject vehicle, and
is configured to calculate at least one of the position of the interested-object on the real space and the distance to the interested-object from the subject vehicle, by an average using three-dimensional coordinates respectively indicated by at least two coordinate points out of the associated two or more coordinate points.

5. The object detection apparatus according to claim 1, wherein said calculator is configured to convert the associated one or more coordinate points to image coordinates of the surrounding image, and is configured to calculate at least one of the position of the interested-object on the real space and the distance to the interested-object from the subject vehicle, from three-dimensional coordinates indicted by a coordinate point that is converted to image coordinates that are the closest to the first image coordinates.

6. The object detection apparatus according to claim 1, wherein
said calculator
is configured to associate the interested-object with two or more coordinate points out of the plurality of coordinate points on the basis of the first image coordinates and the position of the subject vehicle, and
is configured to calculate at least one of the position of the interested-object on the real space and the distance to the interested-object from the subject vehicle, by an average using three-dimensional coordinates respectively indicated by at least two coordinate points out of the associated two or more coordinate points.

* * * * *

UNITED STATES PATENT AND TRADEMARK OFFICE
CERTIFICATE OF CORRECTION

PATENT NO. : 10,909,395 B2
APPLICATION NO. : 15/945973
DATED : February 2, 2021
INVENTOR(S) : Mineki Soga Page 1 of 1

It is certified that error appears in the above-identified patent and that said Letters Patent is hereby corrected as shown below:

In the Specification

In Column 2, Line(s) 61, delete "indicted" and insert --indicated--, therefor.

In the Claims

In Column 8, Line(s) 54, Claim 1, delete "positon" and insert --position--, therefor.

In Column 9, Line(s) 7, Claim 3, delete "indicted" and insert --indicated--, therefor.

In Column 10, Line(s) 7, Claim 5, delete "indicted" and insert --indicated--, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*